(12) United States Patent
Borucki

(10) Patent No.: US 10,586,409 B2
(45) Date of Patent: Mar. 10, 2020

(54) VISUAL VOUCHER COMMUNICATION SYSTEMS AND METHODS

(71) Applicant: NCR Corporation, Duluth, GA (US)

(72) Inventor: Robert Thomas Borucki, Mesa, AZ (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/197,587

(22) Filed: Jun. 29, 2016

(65) Prior Publication Data

US 2018/0005464 A1   Jan. 4, 2018

(51) Int. Cl.
*G07C 9/00* (2006.01)
*G07B 15/00* (2011.01)
*G06Q 10/02* (2012.01)

(52) U.S. Cl.
CPC ......... *G07C 9/00007* (2013.01); *G06Q 10/02* (2013.01); *G07B 15/00* (2013.01); *G07C 9/00103* (2013.01)

(58) Field of Classification Search
CPC .. G06Q 20/045; G06Q 20/0453; G06Q 20/20; G06Q 20/28; G07C 9/00007
USPC .......................................................... 340/5.61
See application file for complete search history.

(56) References Cited

U.S. PATENT DOCUMENTS

| | | | | |
|---|---|---|---|---|
| 7,392,226 | B1* | 6/2008 | Sasaki | G06Q 20/045 705/64 |
| 9,125,014 | B2 | 9/2015 | Block et al. | |
| 10,235,839 | B2* | 3/2019 | Tsutsui | G07F 17/3248 |
| 2003/0014363 | A1* | 1/2003 | Sethi | G06Q 20/06 705/44 |
| 2007/0265892 | A1* | 11/2007 | Valentino | G06Q 10/02 705/5 |
| 2009/0125429 | A1* | 5/2009 | Takayama | G06Q 20/04 705/35 |
| 2009/0313105 | A1* | 12/2009 | Magnusson | G06Q 20/202 705/14.25 |
| 2011/0246369 | A1* | 10/2011 | de Oliveira | G06Q 20/382 705/64 |
| 2012/0130794 | A1* | 5/2012 | Strieder | G06Q 30/0226 705/14.27 |
| 2018/0374288 | A1* | 12/2018 | Barbulescu | G07B 15/00 |

OTHER PUBLICATIONS

European Search Report dated Aug. 16, 2017 in copending European Patent Application 17175540.8.

* cited by examiner

*Primary Examiner* — Yong Hang Jiang
(74) *Attorney, Agent, or Firm* — Schwegman, Lundberg & Woessner

(57) ABSTRACT

Various embodiments each include at least one of systems, devices, methods, and software for visual voucher communication systems and methods. One such embodiment includes receiving an entry request with an account identifier from a requestor and retrieving data of a voucher from a voucher database based on the account identifier and a current voucher requirement. In such embodiments, when voucher data is retrieved, the voucher data is transmitted to the requestor. However, when no voucher data is retrieved and at least one voucher is available, the method includes transmitting a voucher procurement option to the requestor. Otherwise, when no voucher data is retrieved and no voucher is available, data representative thereof is transmitted to the requestor.

11 Claims, 4 Drawing Sheets

VISUAL VOUCHER COMMUNICATION SYSTEMS AND METHODS

BACKGROUND INFORMATION

In mass transit such as bus and rail, users download a ticket or pass to their mobile device that displays a symbol instead of a barcode or other scannable image or data item. The symbol can be easily viewed by a bus driver or train conductor, for example, to make sure that the person has a valid ticket or pass. Such solutions are utilized in situations such as mass transit where a bus driver or train conductor must manage passengers who board from one or multiple entry points where traditional ticket scanning would not be practical. However, such solutions can lend themselves to fraud as it is possible for the images to be replicated and shared, thereby allowing for others to use an image that they are not authorized to use. While changing the images and symbols therein and making them unique to a particular date, time, and route may be possible, such solutions would be challenged for successful deployment as they would rely on spotty wireless service across a number of wireless service providers that would prevent at least some mass transit users from obtaining a current image in a timely manner. The reliability of such a solution and efficiencies gained therefrom would be unpredictable. Additionally, there is also a challenge of communicating the "current" image or symbol to the bus driver or train conductor so that he or she knows what to consider valid. This is further compounded by the need to frequently change such an image.

SUMMARY

Various embodiments each include at least one of systems, devices, methods, and software for visual voucher communication systems and methods. One such embodiment includes receiving an entry request with an account identifier from a requestor and retrieving data of a voucher from a voucher database based on the account identifier and a current voucher requirement. In such embodiments, when voucher data is retrieved, the voucher data is transmitted to the requestor. However, when no voucher data is retrieved and at least one voucher is available, the method includes transmitting a voucher procurement option to the requestor that allows for the user to purchase, or otherwise acquire, a voucher. Otherwise, when no voucher data is retrieved and no voucher is available, data representative thereof is transmitted to the requestor.

In another method embodiment, data of a voucher is retrieved via a network from a voucher database based on an account identifier and a current voucher requirement received via a radio transceiver device in an entry request. When voucher data is retrieved, this method includes transmitting the voucher data to the requestor via the radio transceiver device. But when no voucher data is retrieved, the method includes transmitting data representative thereof to the requestor.

A further embodiment is in the form of a device. A device of some embodiments includes at least one network interface device, at least one radio transceiver device included therein or coupled thereto, at least one processor and at least one memory device. An instruction set is accessible in the at least one memory device and is executable by the at least one processor to perform data processing activities. The data processing activities in some embodiments include retrieving, via the at least one network interface device, data of a voucher from a voucher database based on an account identifier and a current voucher requirement received in an entry request via the at least one radio transceiver device. In such embodiments, when voucher data is received, the data processing activities include transmitting the voucher data to the requestor via the at least one radio transceiver device. However, when no voucher data is retrieved, the data processing activities include transmitting data representative thereof to the requestor via the at least one radio transceiver device.

DETAILED DESCRIPTION

Figure 1:
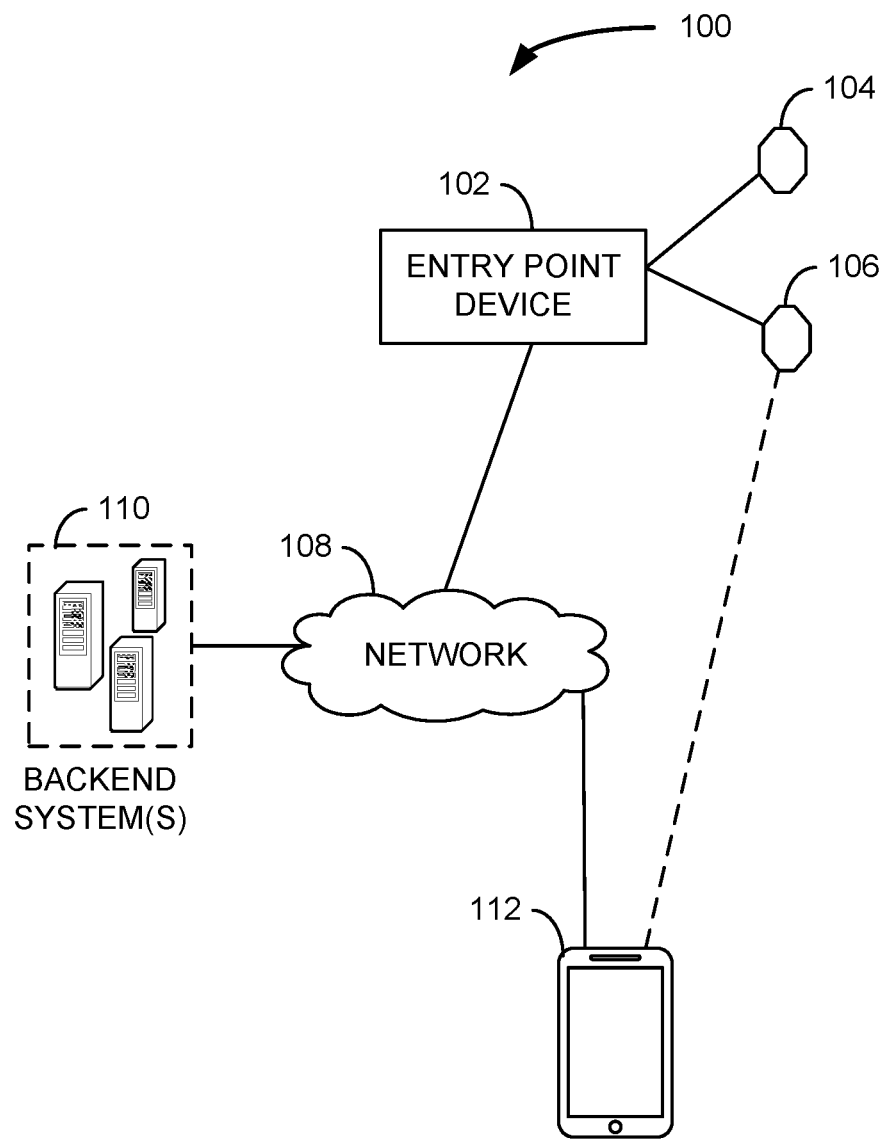
FIG. 1 is an architectural diagram of a system, according to an example embodiment.

Various embodiments each include at least one of systems, devices, methods, and software for visual voucher communication systems and methods. A visual voucher is an electronic data item that may be presented on a mobile device, such as a smartphone, smartwatch, tablet, and the like, for presentation to enter, or show authorization to be present, a controlled access location. For example, to gain entry to, or to verify authorization to be present on, mass transit, such as a bus, subway, rail, ferry, and the like. Unlike a barcoded voucher, a visual voucher is human-readable and presented for visual inspection, not read by a barcode scanner or other scanning/reading device, although a visual voucher may include a barcode or other machine-readable indicia in some embodiments. In some embodiments, visual vouchers may also be utilized to gain entry to controlled access, e.g., ticketed, events, such as ball games, concerts, movies, and other such events. A visual voucher generally includes an image that is displayed on a mobile device and presented when requested by venue or vehicle personnel to gain entry, verify authorization to be present, or as otherwise requested. An image of a visual voucher may be one or more of still, animated, static, and dynamic. As visual vouchers may change, updating the visual voucher and communicating visual vouchers to mobile devices should be reliable and predicable.

Visual vouchers that are current for a particular day, transit route, concert, or other event at a given time need to be updated on both patron mobile devices and for devices used by personnel that are checking visual vouchers. At the same time, patron mobile devices may not have wireless service access due to dead zones, being within a building, radio interference, an overload of wireless devices attempting to access wireless service in an area, and other such reasons. Some of the various embodiments herein include solutions that not only communicate visual vouchers, but also provide solutions to communicate visual vouchers to patron mobile devices in a reliable manner.

One embodiment includes an Entry Point Device (EPD), such as a computer, a portable computer, or mobile device on board a mass transit vehicle or deployed at an event venue is connected to one or more two-way beacon devices, such as two-way BLUETOOTH® beacon devices or Wi-Fi routers. The EPD in such embodiments is connected to a network, such as the Internet, from which the EPD receives updates, either wirelessly or through some other method, as to the current inventory of visual vouchers (e.g., visual tickets) appropriate for that device, such as visual vouchers for a current route of a bus on which the EPD is deployed. For example, the EPD for Train A receives an inventory list that may differ from the list received by the Onboard Device for Train B.

In some such embodiments, according to business rules associated with an individual visual voucher, the appropriate visual voucher image may be broadcast by the EPD using the beacon devices. In other embodiments, a code string representative of the visual voucher image may be transmitted. Regardless of how transmitted, the EPD may communicate data, which when received by a mobile device having an appropriate app of an authenticated user that has purchased or otherwise received a ticket or pass, the app will receive the broadcast visual voucher or data from which the appropriate visual voucher may be determined. The two-way beacon devices are included in some such embodiments for their capability to transmit and receive data. Alternatively, Wi-Fi routers and similar devices may instead be deployed and positioning technology such as GPS may be used in place of beacon devices, such as BLUETOOTH® beacon devices.

Further in some embodiments, an end user purchases or otherwise receives a ticket or pass via a predetermined method (e.g. via a website or mobile app) but does not view the actual visual voucher on their mobile device until boarding a vehicle or entering a venue. The end user has an app on their mobile device which is capable of receiving signals from the beacons or other wireless distribution devices or methods. The app may identify itself to an EPD via a wireless channel, such as via the two-way beacon devices, so that only authorized mobile devices can receive the valid visual voucher. When the mobile device detects that it is within range of an applicable redemption location, it receives the current visual ticket characteristics for that particular train or venue, day, time, etc., the image can then be displayed for inspection by the conductor or other entry point personnel.

Such solutions provide responsible personnel a simple and quick way to know what visual voucher is valid, i.e., by checking the EPD, and visual vouchers, e.g., visual tickets and passes, can be changed as often as justified by business needs, fraud potential and other factors.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor. ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is an architectural diagram of a system 100, according to an example embodiment. The system 100 includes an Entry Point Device (EPD) 102 that is coupled, physically or wirelessly, to one or more beacon devices 104, 106, and a network 108. The system 100 also includes one or more backend systems 110 that are also connected to the network 108. The system 100 further includes user mobile devices 112 that connect wirelessly to the network 108 and to the beacon devices 104, 106.

The EPD 102 may be a computer, a portable computer such as a laptop, a tablet, or other computing device. The EPD 102 is connected either via a wired or wireless connection to the network 108. The EPD 102 may include a display to present a view of a current visual voucher that is specific to an event, a transit route, and the like. The current visual voucher may change over time, such that the visual voucher may be specific to one or a combination of date, time, route, venue, event, gate, door, section, and other such variables. The current visual voucher is controlled by a process that executes on the one or more backend systems 110 and communicates current visual voucher data to the EPD 102 via the network 108.

Users, such as patrons of mass transit services and events, gain access or validate their presence by presenting a visual voucher on their mobile devices 112. An app that executes on the mobile device 112 provides an interface through which a visual voucher may be purchased through interaction with the one or more backend systems 110. The mobile device 112 app may then receive visual voucher data in for the purchased ticket, or pass if it is good for more than one event, route, or day. The visual voucher may than be stored on the mobile device.

However, as the visual voucher may change, the visual properties thereof may be updated or not even set until shortly before or at the start of an event or route, the mobile device 112 needs, in some embodiments, an active network 108 connection to obtain current visual voucher data. In some instances, the mobile device 112 may have direct network 108 access, but in other instances, network 108 access may be limited due to being below grade in a subway tunnel, at an event where wireless service capacity is not capable of meeting demand, inside a building, in a remote location, or in another location where direct network 108 access is not available via wireless service. In such instances, the mobile device 112 may communicate with one or more two-way beacon devices 104, 106 to receive data from the EPD 102 and to communicate data thereto, such as data identifying an authenticated user of the mobile device 112 app. In some such embodiments, the mobile device 112 may not connect directly to the network 108, instead connecting indirectly to the network 108 via one of the beacon devices 104, 106, such as beacon device 106 as indicated by the illustrated dashed line in FIG. 1. In such embodiments, the connection between the mobile device 112 and the network 108 as indicated by the solid line in FIG. 1 would not be present, or at least active. The EPD 102 may then provide current visual voucher data to the mobile device 112 app either as an image to present, an identifier of an image already in inventory on the mobile device, one or more parameters from which to generate or manipulate an image, and the like.

As the beacon devices 104, 106 are able to communicate over relatively short distances (e.g., distances measured in feet and not miles), the mobile device 112 must be proximately present to obtain an update to a visual voucher. However, some embodiments may utilize Wi-FI or even wireless service to obtain updates. At the same time, some such embodiments may still desire to enforce a physical proximity requirement before a mobile device 112 app is able to obtain a visual voucher update. In such embodiments, a positioning requirement may be enforced though use of one-way beacon devices deployed at an entry point or within a venue or vehicle. Other embodiments may utilize global positioning system functionality that is available on many mobile devices 112. The position solution of a particular embodiment may then be utilized to determine a mobile device location in physical proximity to a certain location and then provide the visual voucher update.

Figure 2:
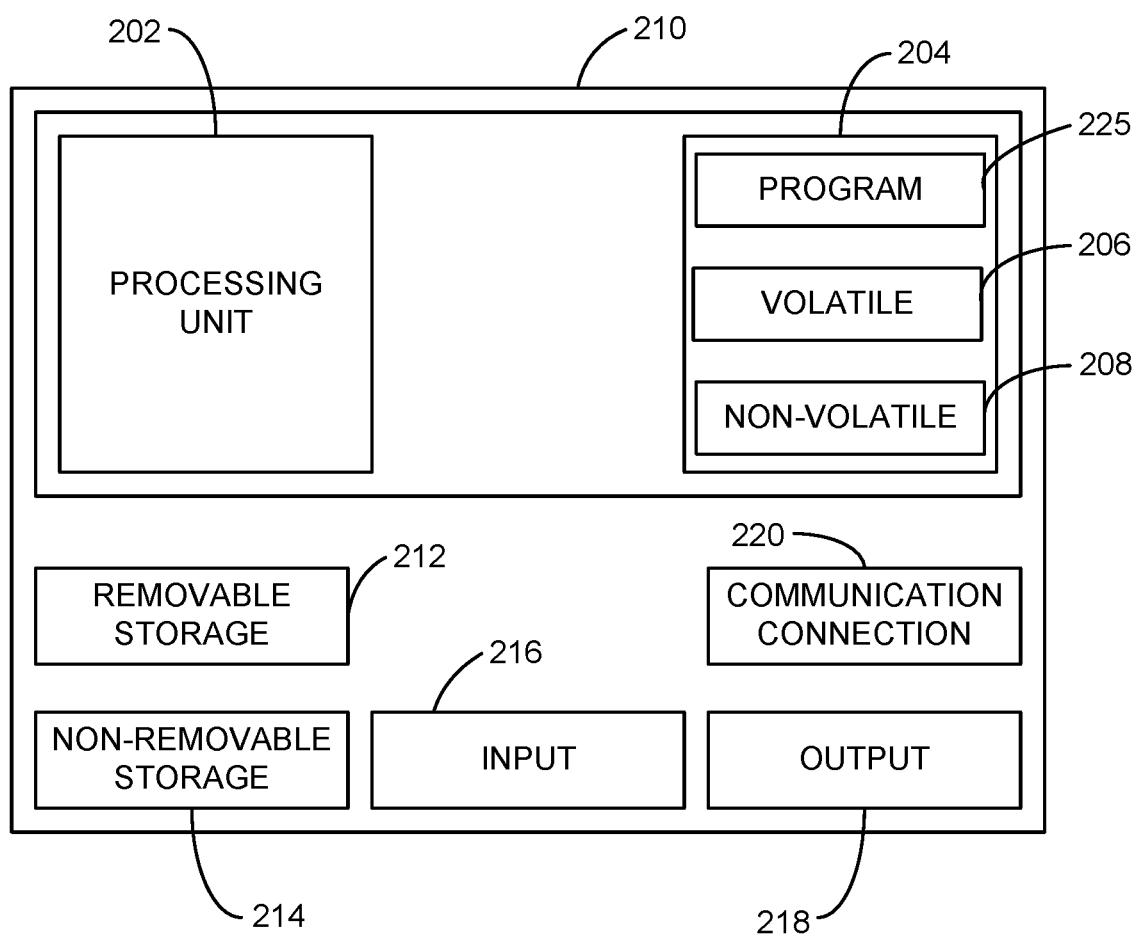
FIG. 2 is a block diagram of a computing device, according to an example embodiment.

FIG. 2 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. The computing device of FIG. 2 may be implemented as one or more of the EPD 102, one or more backend system 110, and mobile device 112 of FIG. 1.

One example computing device in the form of a computer 210, may include a processing unit 202, memory 204, removable storage 212, and non-removable storage 214. Although the example computing device is illustrated and described as computer 210, the computing device may be in different forms in different embodiments. For example, the computing device may instead be a smartphone, a tablet, smartwatch, or other computing device including the same or similar elements as illustrated and described with regard to FIG. 2. Devices such as smartphones, tablets, and smartwatches are generally collectively referred to as mobile devices. Further, although the various data storage elements are illustrated as part of the computer 210, the storage may also or alternatively include cloud-based storage accessible via a network, such as the Internet.

Returning to the computer 210, memory 204 may include volatile memory 206 and non-volatile memory 208. Computer 210 may include—or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 210 may include or have access to a computing environment that includes input 216, output 218, and a communication connection 220. The input 216 may include one or more of a touchscreen, touchpad, mouse, keyboard, camera, one or more device-specific buttons, one or more sensors integrated within or coupled via wired or wireless data connections to the computer 210, and other input devices. The computer 210 may operate in a networked environment using a communication connection 220 to connect to one or more remote computers, such as database servers, web servers, and other computing device. An example remote computer may include a personal computer (PC), server, router, network PC, a peer device or other common network node, or the like. The communication connection 220 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 220 may also or alternatively include a transceiver device, such as a BLUETOOTH® device that enables the computer 210 to wirelessly receive data from and transmit data to other BLUETOOTH® devices.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, various computer programs 225 or apps, such as one or more applications and modules implementing one or more of the methods illustrated and described herein or an app or application that executes on a mobile device or is accessible via a web browser, may be stored on a non-transitory computer-readable medium.

Figure 3:
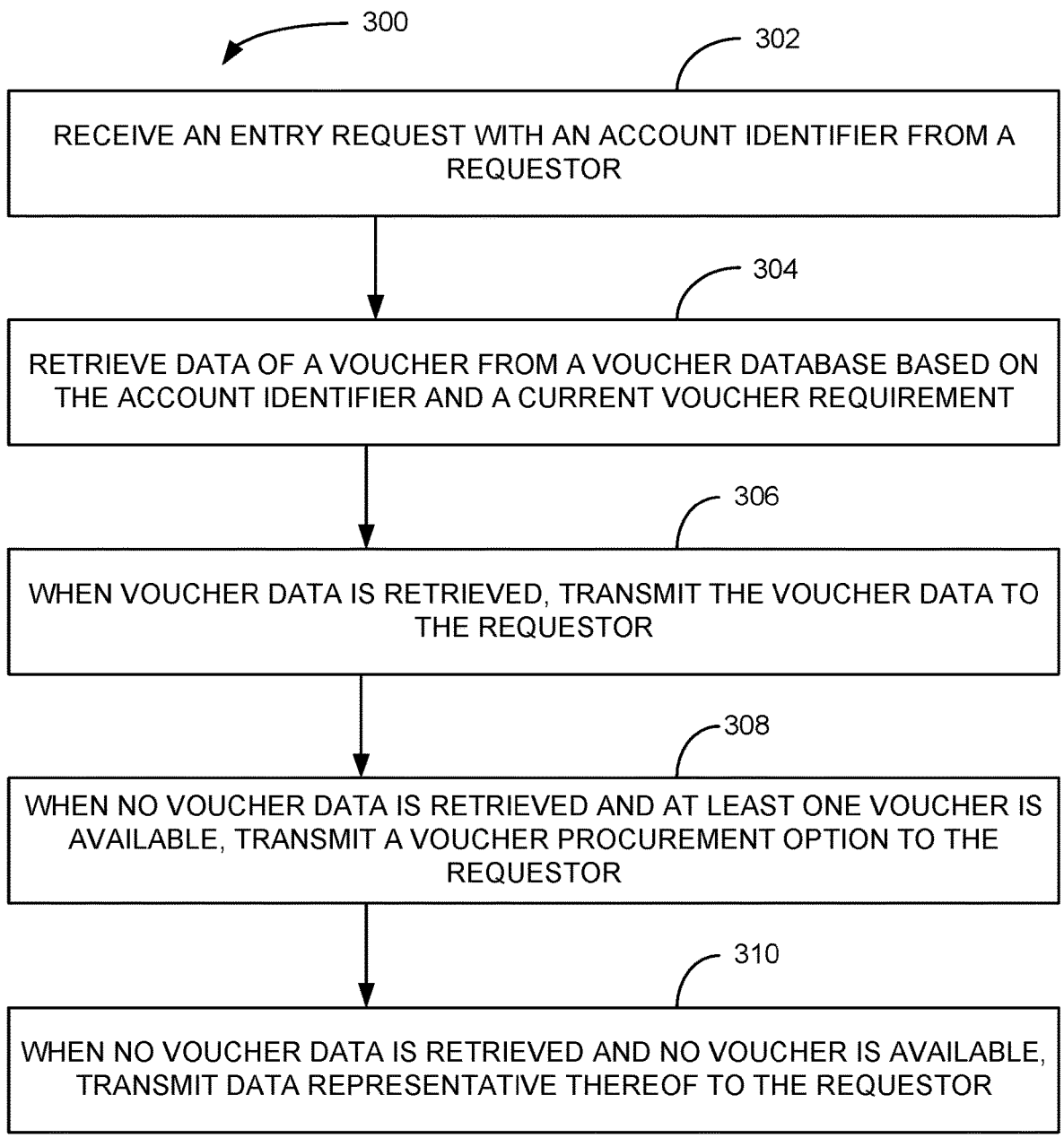
FIG. 3 is a block flow diagram of a method, according to an example embodiment.

FIG. 3 is a block flow diagram of a method 300, according to an example embodiment. The method 300 is an example of a method that may be performed by one or both of the EPD 102 and the one or more backend systems 110 of FIG. 1.

The method 300, in some embodiments, includes receiving 302 an entry request with an account identifier from a requestor, such as a mobile device app. The method 300 then retrieves 304 data of a voucher from a voucher database based on the account identifier and a current voucher requirement. The voucher database may be a database that stores voucher data in association with user accounts. The voucher database may or may not be under management of a database management system as it may alternatively be a defined file structure, a defined and formatted dataset, or other data storage and retrieval arrangement. In such embodiments, when voucher data is retrieved 304, the method 300 includes transmitting 306 the voucher data to the requestor. Alternatively, when no voucher data is retrieved 304 and at least one voucher is available (e.g., a voucher is available for purchase), the method 300 includes transmitting 308 a voucher procurement option to the requestor. However, when no voucher data is retrieved 304 and no voucher is available, the method 300 includes transmitting 310 data representative thereof to the requestor.

In some embodiments, the received 302 entry request includes an identifier of the current voucher requirement. For example, an EPD upon received of a request for entry or a current visual voucher from a mobile device, the EPD device may transmit an identifier of a current voucher requirement to the backend system to allow the backend system to determine whether the particular user has purchased or otherwise procured a current visual voucher. The identifier of the current voucher requirement may be one or a combination of a transit route identifier, an event identifier, a current date and time, or other data items that may be relevant in a particular embodiment deployment context. In another embodiment, the requirement identifier data item may be broadcast by a beacon device and received by a mobile device app. The mobile device app may then utilize the data item to retrieve the current visual voucher from the backend system.

In some embodiments of the method 300, the voucher data transmitted 306 to the requestor includes visual voucher data. For example, the voucher data may include an identifier of an image for presentation via a display device of a mobile device as a visual voucher. The voucher data may also or alternatively include a variable with regard to a property of the visual voucher, the variable utilized by an app on the mobile device that presents the visual voucher, the variable instructing the app on how to modify the image when presented.

Figure 4:
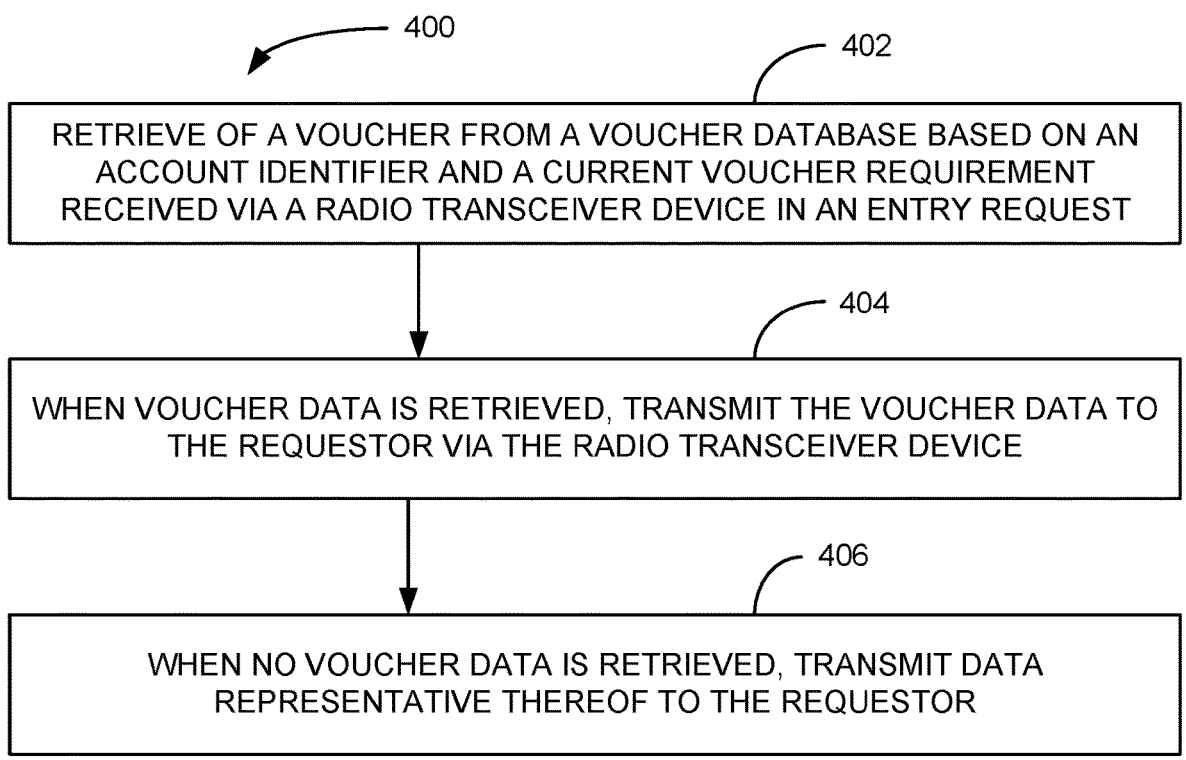
FIG. 4 is a block flow diagram of a method, according to an example embodiment.

FIG. 4 is a block flow diagram of a method 400, according to an example embodiment. The method 400 is a further streamlined embodiment that may be performed by one or both of the EPD 102 and the one or more backend systems 110 of FIG. 1.

The method 400 includes retrieving 402, via a network, data of a voucher from a voucher database based on an account identifier and a current voucher requirement received via a radio transceiver device in an entry request. When voucher data is retrieved 402, some embodiments include transmitting 404 the voucher data to the requestor via the radio transceiver device. Otherwise, when no voucher data is retrieved 402, the method 400 includes transmitting 406 data representative thereof to the requestor. This data may then inform a mobile device app to present a visual voucher procurement option.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:

receiving, by an entry point device via a peer-to-peer wireless transceiver device coupled thereto, an entry request with an account identifier from a requestor mobile device;

retrieving, by the entry point device, data of a voucher from a voucher database based on the account identifier and a current voucher requirement, the voucher data including visual voucher data for presentment on a mobile device display at an entry point where the entry point device is located and is human-readable to gain entry and not read by an electronic reading device, and the visual voucher data including a visual element that is variably modified to change how the visual voucher data is presented by the mobile to match a current image that indicates an authorized entry;

when voucher data is retrieved, transmitting the voucher data from the entry point device to the requestor mobile device via the peer-to-peer wireless transceiver device and presenting a view generated based on the retrieved voucher data on a display of an entry point device performing the method;

when no voucher data is retrieved by the entry point device and at least one voucher is available, automatically transmitting a message that no voucher data was retrieved and a voucher procurement option to the requestor mobile device via the peer-to-peer wireless transceiver device and presenting a view on the display of the entry point device indicating no voucher data was retrieved and an option to procure the available voucher;

when no voucher data is retrieved and no voucher is available, transmitting data representative thereof to the requestor mobile device via the peer-to-peer wireless transceiver device and presenting a view on the display of the entry point device indicating no voucher data was retrieved and no voucher is available; and wherein the peer-to-peer wireless transceiver device allows the mobile device to obtain a voucher through communication enabled by the peer-to-peer wireless transceiver device when other data connectivity of the mobile device is not reliable.

2. The method of claim 1, wherein the entry request includes an identifier of the current voucher requirement.

3. The method of claim 2, wherein the identifier of the current voucher requirement is a transportation segment identifier for which entry is being sought.

4. The method of claim 1, further comprising:

receiving a second request from the requestor for a current visual voucher with the identifier of the current voucher requirement;

retrieving current visual voucher data from the voucher database based on the identifier of the current voucher requirement; and transmitting the current visual voucher data to the requestor.

5. A method performed by an entry point computing device deployed at a point of entry location where entry requests originate, the method comprising:

requesting, via a network, current visual voucher data with an account identifier and an identifier of current voucher requirement received in an entry request from a requestor mobile device via a peer-to-peer radio transceiver device coupled to the entry point computing device;

retrieving, via the network by the entry point computing device, the requested current visual voucher data from a voucher database based on the received account identifier and current voucher requirement received in the entry request via the peer-to-peer radio transceiver device in the entry request;

when current visual voucher data is retrieved, automatically transmitting the voucher data to the requestor via the peer-to-peer radio transceiver device and presenting, on a display device of the entry point computing device, a view of the current visual voucher based on the received current visual voucher data;

when no current visual voucher data is retrieved, automatically transmitting data representative thereof to the requestor and presenting a view on the display device indicating no visual voucher data was received; and wherein:

the peer-to-peer radio transceiver device allows the requestor mobile device to obtain a voucher through communication enabled by the peer-to-peer radio transceiver device when other data connectivity of the requestor mobile device is not reliable; and a visual voucher is human-readable when presented on a mobile device for visual inspection by personnel at the entry point, not read by an electronic reading device, and the visual voucher data including a visual element that is variably modified to change how the visual voucher data is presented by the mobile to match a current image that indicates an authorized entry.

6. The method of claim 5, wherein the radio transceiver device is at least one short-range radio device coupled to the computing device deployed at the point of entry location.

7. The method of claim 6, wherein the at least one short-range radio device is a beacon device.

8. The method of claim 6, wherein the entry request is received from an app that executes on a mobile device.

9. A device, deployed as an entry point device, comprising:
   at least one network interface device;
   at least one peer-to-peer radio transceiver device included therein or coupled thereto;
   at least one display device;
   at least one processor and at least one memory device; and
   an instruction set accessible in the at least one memory device and executable by the at least one processor to perform data processing activities, the data processing activities comprising:
      requesting, via a network with the at least one network interface device, current visual voucher data with an account identifier and an identifier of current voucher requirement received in an entry request from a requestor mobile device via the peer-to-peer radio transceiver device of the entry point device;
      retrieving, via the network with the at least one network interface device, the requested current visual voucher data from a voucher database based on the received account identifier and current voucher requirement received in an entry request via the at least one peer-to-peer radio transceiver device;
      when the current voucher data is received, automatically transmitting the current voucher data to the requestor via the at least one peer-to-peer radio transceiver device and presenting, on the display device, a view of the current visual voucher based on the received current visual voucher data;
      when no the current voucher data is retrieved, automatically transmitting data representative thereof to the requestor via the at least one peer-to-peer radio transceiver device and presenting a view on the display device indicating no visual voucher data was received; and
   wherein:
      the peer-to-peer radio transceiver device allows the requestor mobile device to obtain a voucher through communication enabled by the peer-to-peer radio transceiver device when other data connectivity of the requestor mobile device is not reliable; and
      wherein a visual voucher is human-readable when presented on a mobile device for visual inspection by personnel at the entry point, not read by an electronic reading device, and the visual voucher data including a visual element that is variably modified to change how the visual voucher data is presented by the mobile to match a current image that indicates an authorized entry.

10. The device of claim 9, wherein:
the device is deployed at a point of entry location where the entry request originates.

11. The device of claim 9, wherein the at least one radio transceiver device includes at least one short-range radio beacon device deployed at an entry location and coupled to the device that may be located elsewhere.

\* \* \* \* \*